United States Patent [19]
Rathore et al.

[11] Patent Number: 5,987,101
[45] Date of Patent: Nov. 16, 1999

[54] METHOD AND APPARATUS FOR DETERMINING A CALLER'S ODDS FOR WINNING A LOTTERY BASED ON CALLER HISTORY

[75] Inventors: Ram N. S. Rathore, Randolph; Gregg Alan Toney, Chester; Roy Philip Weber, Bridgewater, all of N.J.

[73] Assignee: AT&T Corp., New York, N.Y.

[21] Appl. No.: 09/274,143

[22] Filed: Mar. 22, 1999

[51] Int. Cl.⁶ .................................................. H04M 11/00
[52] U.S. Cl. ........................................ 379/93.13; 463/41
[58] Field of Search ............................. 379/93.13, 93.12, 379/90.01, 110.01; 273/138.1; 463/17, 41

[56] References Cited

U.S. PATENT DOCUMENTS

| | | | |
|---|---|---|---|
| 4,792,968 | 12/1988 | Katz | 379/92 |
| 4,845,739 | 7/1989 | Katz | 379/92 |
| 4,996,705 | 2/1991 | Entenmann et al. | 379/91 |
| 5,073,929 | 12/1991 | Katz | 379/93 |
| 5,083,272 | 1/1992 | Walker et al. | 364/412 |
| 5,128,984 | 7/1992 | Katz | 379/92 |
| 5,251,252 | 10/1993 | Katz | 379/92 |
| 5,327,485 | 7/1994 | Leaden | 379/95 |
| 5,354,069 | 10/1994 | Guttman et al. | 273/439 |
| 5,403,999 | 4/1995 | Entenmann et al. | 235/379 |
| 5,608,785 | 3/1997 | Kasday | 379/93.13 |
| 5,713,795 | 2/1998 | Kohorn | 463/17 |
| 5,835,576 | 11/1998 | Katz | 379/93.13 |

*Primary Examiner*—Wing F. Chan

[57] ABSTRACT

A method and apparatus determine a caller's eligibility to enter a lottery, determine whether the caller has won the lottery and advise the caller of the winning status in response to a caller's request for communication services. The odds of winning a lottery for the caller can be adjusted based on the caller's participation history, such as a past number of calls made or total call time logged by the caller. Thus, frequent users of a communication service can be rewarded with increased odds of winning a lottery each time a request for communication services is made and communication services are provided.

13 Claims, 4 Drawing Sheets

METHOD AND APPARATUS FOR DETERMINING A CALLER'S ODDS FOR WINNING A LOTTERY BASED ON CALLER HISTORY

RELATED APPLICATIONS

This application is related to the following concurrently filed and commonly assigned applications: entitled "Method And Apparatus For Determining A Call-Based Lottery Winner's Prize Tier Based On Caller Participation History;" entitled "Method And Apparatus For Determining A Caller's Eligibility For A Lottery And Advising Lottery Winner During A Same Call;" entitled "Method And Apparatus For Rewarding Groups Of Communication Service Users;" and entitled "Lottery Method And Apparatus Having A Tiered Prize Scheme."

BACKGROUND OF THE INVENTION

1. Field of Invention

This invention relates to a method and apparatus for determining if a caller is eligible for entry into a lottery and determining the caller's odds for winning based on the caller's participation history.

2. Description of Related Art

Traditional lottery systems, or other similar games of chance, require players to purchase lottery tickets or make some other similar directed action to enter a lottery. For example, U.S. Pat. No. 5,403,999 to Entenmann et al. describes a system that allows a player to enter a lottery by calling a specific telephone number and entering the lottery over the telephone. Thus, in the Entenmann system, the player can enter, win and be advised of winning the lottery during a single telephone call specifically made to enter the lottery.

SUMMARY OF THE INVENTION

The invention provides a method and apparatus for determining a caller's eligibility to enter a lottery, and determining the caller's odds for winning the lottery based on the caller's participation history, in response to a call made by the caller to a called party. That is, the caller need not make a specific directed action, e.g., telephone a specific telephone number, to enter and win a lottery. Instead, according to at least one aspect of the invention, a caller can enter and win a lottery by calling any called party.

Therefore, each time a caller makes a request for communication services, e.g., the caller dials a called party's telephone number, and is connected to the called party, a determination can be made whether the caller is eligible for entry into a lottery. This determination can be made based on various criteria, e.g., the caller made a credit card telephone call, a regular long distance call, a dial-around code based call, the time of day, a "call destination", etc. If the caller is eligible for entry into a lottery, a determination can next be made whether the caller has won the lottery. This determination can be adjusted based on various criteria, including the caller's participation history, which can include a total number of calls made by the caller over a past period of time, e.g., the last 30, 60 or 90 days. Thus, the caller's odds for winning the lottery can be adjusted based on the caller's participation history. For example, if a lottery has defined odds for winning, e.g., one in ten thousand, the caller could be provided with two or more entries into the lottery to adjust the odds of winning. Alternately, the caller could be given one entry into the lottery and the odds for winning the lottery could be adjusted in another way. By adjusting the odds for winning, frequent callers or users of the communication system can be rewarded with increased odds of winning as compared to less frequent callers. The caller can be advised that the caller has won the lottery during the call that entered the caller into the lottery. However, this is not necessary and the caller can be advised at some later time.

These and other aspects of the invention will be appreciated and/or will be obvious in view of the description detailed below.

BRIEF DESCRIPTION OF THE DRAWINGS

The invention is described below with reference to the following drawings in which like reference numerals refer to like elements.

DETAILED DESCRIPTION OF PREFERRED EMBODIMENTS

The invention is described below in connection with a telecommunication system. That is, as described below, callers make telephone calls to request communication services and communicate with a desired called party. However, it will be appreciated that the invention can be used with other types of communication systems, including wired and wireless communication systems, computer or other similar networks such as the Internet, etc. For example, the invention could be used as part of an Internet service provider (ISP) system such that each time a user accesses the Internet, a particular web site, a particular number or combination of web sites, or other similar computer network through the ISP's system, the user can be entered into and win a lottery. The user can access the Internet, computer network or other information source through a cable, satellite or other network or combination of networks. Likewise, communication service users that connect to a particular Internet web site, or view/interact with a particular television or other communication channel (either digital or analog) can be entered into and win a lottery. For example, users could be rewarded for viewing a particular television or other similar communication channel. Thus, the invention is not limited to use with telecommunication systems.

The term called party is used in this description to refer to any person, entity, communication device or other communication destination other than an entity or system specifically engaged in receiving requests for entry into a lottery, entering callers into a lottery and advising callers of their winning status, if appropriate. That is, the invention is not directed to dedicated lottery systems that receive communications, such as telephone calls, from callers to enter a lottery. Likewise, the term call is used to refer to any type of communications between a caller and a called party, not just telephone calls. Thus, a caller can "call" a called party over a telecommunications network, a computer network, the Internet, etc.

Figure 1:
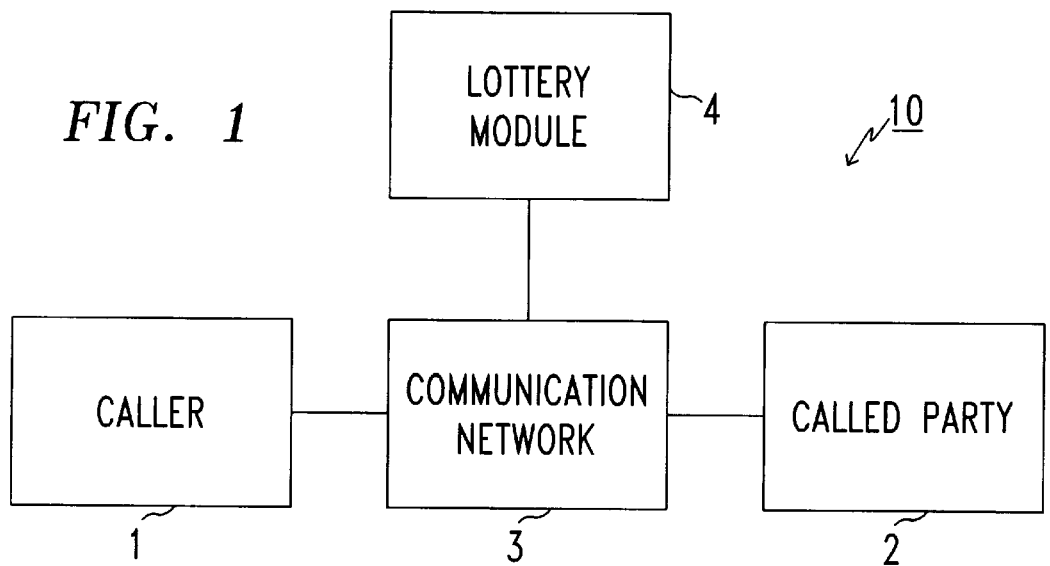
FIG. 1 is a schematic block diagram of a communication system configured in accordance with the invention.

FIG. 1 is a schematic block diagram of a communications system 10 configured in accordance with the invention. A caller 1 makes a request for communication services so that the caller 1 can communicate with a desired called party 2. The caller 1 and/or the called party 2 can be a person or communication device, as desired. The caller 1 and/or the called party 2 can use, or can include, any number of different types of communication devices, including wired and wireless telephones, facsimile machines, modems, programmed general purpose computers, etc. Thus, any one- or two-way communication device can be used for communication between the caller 1 and the called party 2.

The caller 1's request for communication services can take different forms, depending upon the type of communication network 3 used to provide the communication services. In this example, the communication network 3 is a switched telecommunications network, and so the request for communication services can include a dialed telephone number. However, the communication network 3 can include other communication systems, and the request for communication services will likely change accordingly.

When the communication network 3 receives the call request and provides communication services, e.g., sends communication information between the caller 1 and the called party 2, a lottery module 4 is notified of the call. The lottery module 4 then determines if the caller 1, or other entity associated with the call, is eligible for entry into a lottery. In this example, a possible other entity associated with the call could be a person, group or business entity that maintains or is otherwise associated with the communication device used by the caller 1 to make the call to the called party 2. For example, a caller 1, who is actually using a communication device to make a telephone call, may be borrowing another person's telephone to make the call. In this case, the lottery module 4 can determine that the person who owns the telephone or is responsible for paying for calls made using the telephone is eligible for entry into the lottery, rather than the actual caller. In contrast, the lottery module 4 could determine whether the actual caller 1 is eligible for entry into the lottery even if the caller 1 is not usually associated with the telephone being used to make a call. In this case, the caller 1 can enter an identification number, dial a specific access telephone number or follow some other procedure to identify the caller 1's identity to the lottery module 4 regardless of the telephone or other communication device being used to obtain communication services. However, for ease of reference, the term caller is used to refer to both the actual caller and/or any other entity associated with the call made.

While communication services are being provided to the caller 1, the lottery module 4 determines whether the caller 1 is eligible for entry into a lottery and, if so, whether the caller 1 is a winner of the lottery. As discussed above, the caller 1's odds of winning the lottery can be adjusted (e.g., increased), if desired, based on the caller 1's past participation or call history, or other factors. If the caller 1 is a winner, the caller 1 is preferably advised of the winning status while communication services are being provided. For example, the lottery module 4 could interrupt the caller 1's call to advise the caller 1 of the winning status, call the caller 1 on another telephone line, display a video message on the caller 1's communication device or otherwise advise the caller 1 of the winning status. If the caller 1 is not a winner of the lottery, the lottery module 4 can either advise the caller 1 that the caller 1 did not win the lottery this time, or make no announcement at all to the caller 1. When the caller 1 or called party 2 wishes to terminate the communication services, e.g., by hanging up the telephone, the communication services are terminated.

Figure 2:
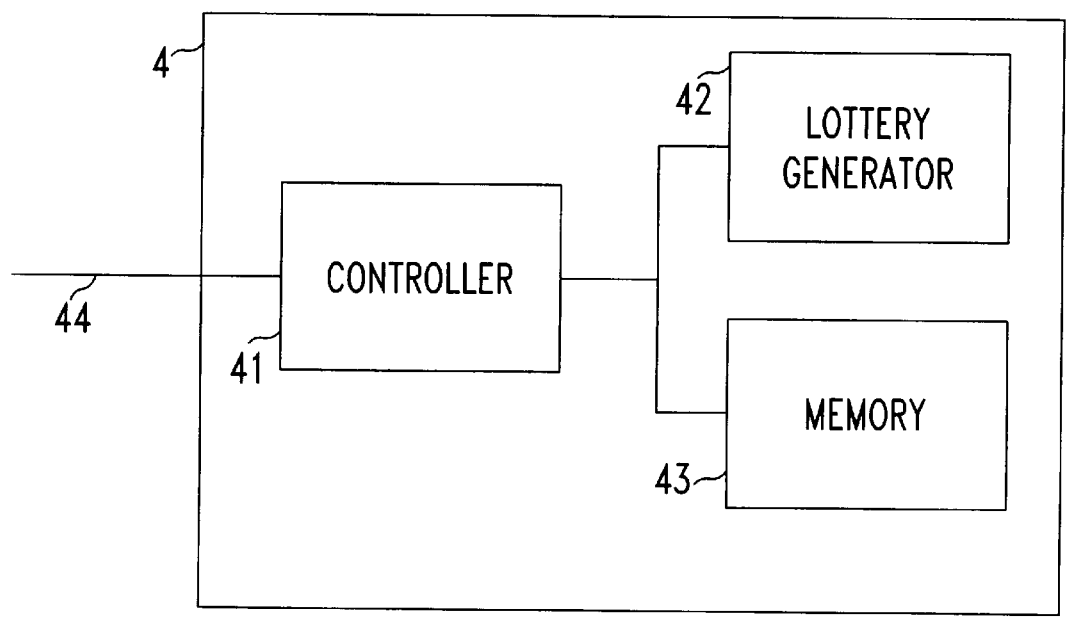
FIG. 2 is a schematic block diagram of a lottery module.

FIG. 2 is a schematic block diagram of one example of a lottery module. In this example, the lottery module 4 includes a controller 41 that receives and sends signals over a line 44, which communicates with the communication network 3. For example, the controller 41 can receive a signal over the line 44 from the communication network 3 indicating that a call request has been made and communication services are being provided to a caller 1. In response to the received signal, which can include information identifying the caller 1, the call's originating telephone number, the destination telephone number, other call destination information, etc., the controller 41 determines whether the caller 1 is eligible for entry into a lottery. Alternately, all callers 1 using the communications network 3 can be eligible for entry into a lottery for each call made. The eligibility determination can be based on various factors including information received from the communication network 3 and/or other information stored in a memory 43. The memory 43 can store information such as a caller 1's profile, including a number of calls made by the caller 1 during a past period of time, a total amount of call time used by the caller 1, the types of calls made by the caller 1, etc. The controller 41 can also use information such as the time of day or day that a call is made, a specific dial-around code used to place a call, a call destination, or other information. In short, the controller 41 can use any desired information to make the eligibility determination.

Once the controller 41 determines that a caller 1 is eligible for entry into a lottery, the controller 41 sends a signal to a lottery generator 42 to enter the caller 1 into a lottery. The lottery generator 42 can enter the caller 1 into a standard lottery having defined odds and then provide an indication to the controller 41 whether the caller 1 has won the lottery. Alternately, the lottery generator 42 can adjust the odds of winning the lottery for the caller 1 based on the caller 1's past participation history, which can include any of the information discussed above used to make an eligibility determination. For example, the caller 1's odds of winning can be adjusted based on a number of calls placed by the caller 1 during a past time period, a total call time logged by the caller 1, the types of calls, e.g., credit card calls, dial-around calls, etc., a call destination such as a telephone number or geographical region, a time of day, a number of past entries into lotteries, a number of past lottery wins, etc. The odds of winning can be adjusted in any desired way, including providing the caller 1 with multiple entries into a lottery having predefined odds for winning, or providing the caller 1 with a single entry into a lottery that has adjusted odds.

If the caller 1 wins the lottery, the controller 41 sends a signal to the communication network 3 to notify the caller 1 of the caller 1's winning status. Preferably, the caller 1 is notified while the call that prompted entry into the lottery is ongoing. However, the caller 1 can be notified after the call has been terminated. The caller 1 can be notified of the winning status in various ways, including providing a voice message to the caller 1, displaying a message on the caller 1's communication device, by telephoning the caller 1 on a separate telephone line, sending a facsimile or e-mail message to the caller 1, etc.

As one example, a caller 1 in New York can place a call to a called party 2 in California using a specific dial-around code. Communication information is sent between the caller 1 and called party 2 and the lottery module 4 receives an indication that the call has been placed and communication services are being provided. The controller 41 determines whether the caller 1 is eligible for entry into a lottery based on desired criteria. For example, the fact that the caller 1 used the specific dial-around code could be enough to determine that the caller 1 is eligible for entry into a lottery. Alternately, other information, as discussed above, can be used for the eligibility determination. For example, the caller 1 could be determined eligible for entry into a lottery based on the fact that the caller 1 is calling California at 3 p.m. on a Thursday. Likewise, the caller 1 could be determined eligible because the caller 1 has made 20 or more calls to California during the past month, for example. Such eligibility determinations are not required, however, and each call indication received by the controller 41 could prompt entry into a lottery.

Once the caller 1 is determined to be eligible, the lottery generator 42 determines if the caller 1 has won the lottery. The caller 1 could be entered into a lottery having defined odds, e.g., one in ten thousand, or the caller 1's odds of winning could be adjusted as discussed above. For example, the caller 1 could have made more than a threshold number of calls using a specific dial-around code during the last month, and therefore be entitled to increased odds of winning the lottery. Of course, other criteria can be used to determine whether and to what extent a caller 1 is entitled to adjusted odds of winning a lottery. Therefore, frequent callers can be rewarded with increased odds of winning a lottery. For example, callers that make calls at a first level (e.g., total time or frequency) could be assigned a first level of odds of winning; callers that make calls at a second higher level could be assigned a second higher level of odds of winning; and so on. One possible way of adjusting a caller 1's odds is to provide the caller 1 with multiple entries into a lottery having defined odds. If the caller 1 wins the lottery, the caller 1 is advised of the winning status, preferably while communication services are being provided.

The lottery module 4 can be implemented, at least in part, as a general purpose data processor and/or single special purpose integrated circuit (e.g., ASIC) or an array of ASICs each having a main or central processor section for overall, system-level control, and separate sections dedicated to performing various specific computations, functions and other processes under the control of the central processor section. The lottery module 4 can also be implemented using a plurality of separate dedicated programmable integrated or electronic circuits or devices, e.g., hard-wired electronic or logic circuits, such as discrete element circuits or programmable logic devices. The lottery module 4 also preferably includes other devices, such as volatile or non-volatile memory devices, communication devices, and/or other circuitry or components necessary to perform the desired input/output or other functions. For example, the lottery module 4 can include an interface, such as a user interface including a keyboard, monitor, user pointing device, etc. that allows an operator to input information into and receive information from the lottery module 4. The interface may also include other communications devices, including modems or other data communication devices, to allow the lottery module 4 to receive and send information.

The memory 43 can be one or more volatile and/or non-volatile memory devices, such as optical disks, magnetic media, semiconductor or other memory devices. The lottery generator 42 can be implemented as a software module that is executed by the controller 41 or any other suitable data processing apparatus. Alternately, the lottery module 42 can be implemented as hard-wired electronic circuits or other programmed integrated or other electronic circuits or devices, e.g., hard-wired electronic or logic circuits such as discrete element circuits or programmable logic devices.

Figure 3:
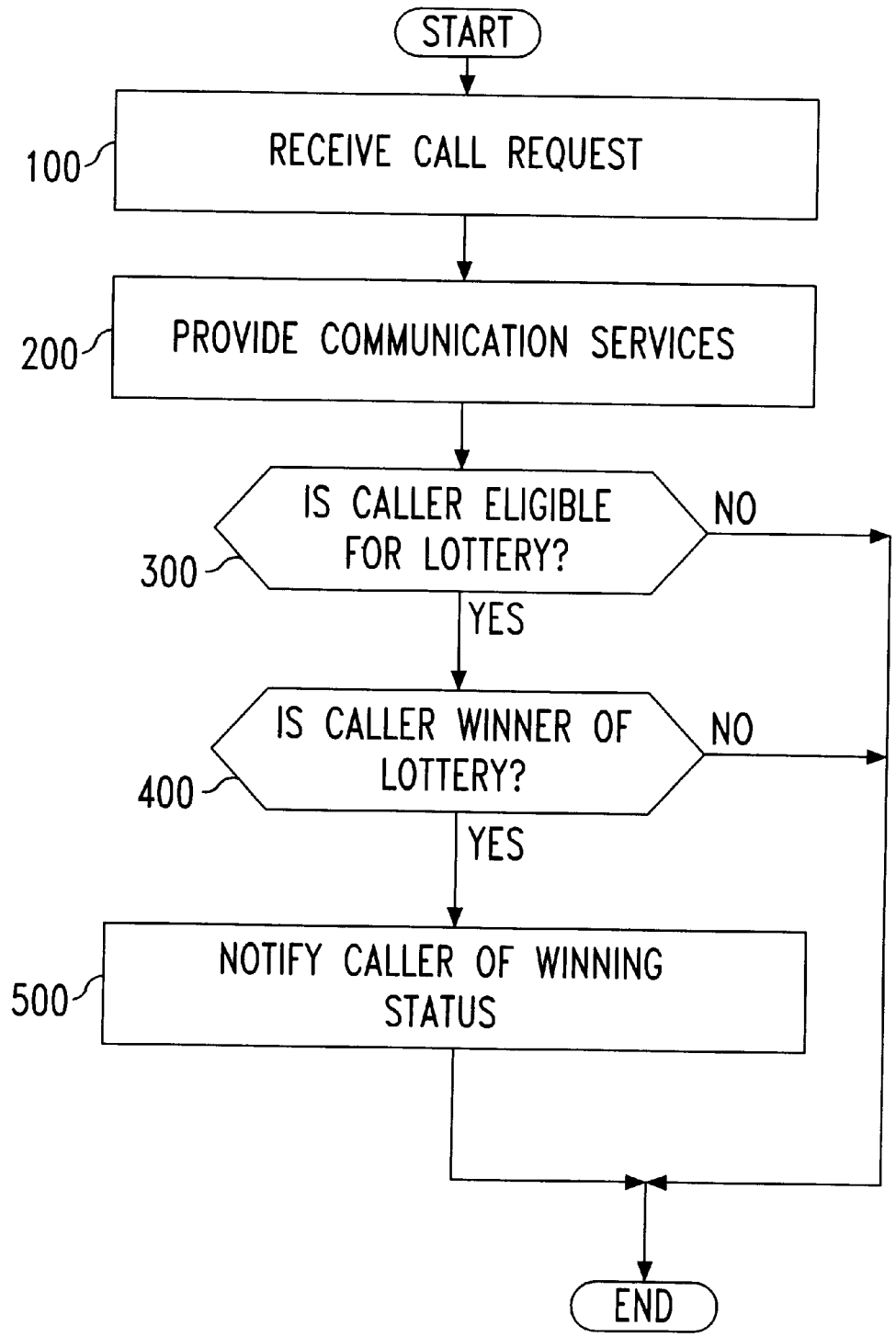
FIG. 3 is a flowchart of steps of a method for determining a caller's eligibility for entry into a lottery and determining whether the caller is a winner of the lottery.

FIG. 3 is a flowchart of steps for a method for determining a caller's eligibility for a lottery and advising the caller of the winning status. In step 100, a call request is received from a caller. For example, a call request can be a dialed telephone number or other number sequence using a telephone linked to a telecommunications network. However, the call request can be any signal or other indication that a caller would like to communicate with a called party using any type of communications system, e.g., the caller would like to receive information from an Internet web site or other communication channel. In step 200, communication services are provided to allow communication between the caller and a called party. The communication services can include transmitting voice and/or data communications between the caller and the called party. However as discussed above, the communication services can be provided by any communication system, not just telecommunications systems.

In step 300, a determination is made whether the caller is eligible for a lottery. Preferably, this determination is made while communication services in step 200 are being provided. However, the determination in step 300 can be made after communication services have been terminated. If the caller is not eligible for a lottery, flow jumps to the end of the flowchart, at which time the caller can be advised that the caller is not eligible for a lottery. However, the caller need not be advised that the caller has been denied entry into a lottery.

If the caller is eligible for a lottery, a determination is made in step 400 whether the caller is a winner of the lottery. This determination can be made in any number of different ways, including using a random number generator to generate a number and then determining whether the randomly generated number matches or otherwise corresponds to a number associated with the caller. The number assigned to the caller can be a number that is assigned permanently, e.g., when the caller first obtains telephone service, or can be assigned to the caller each time the caller is entered into a lottery. However, the caller can be determined to be a winner of the lottery in other ways. The term lottery is used herein to refer to a game of chance or pseudo-game of chance such that the caller has a random, or pseudo-random, chance of winning. Thus, the lottery can be constructed to give the appearance of random winning when, in fact, the probability for a caller or other entity winning the lottery is adjusted based on various criteria, including a total number of calls made or call minutes used by a caller during a recent past time period, the types of calls, e.g., credit card calls, dial-around calls, etc., a call destination such as a telephone number or geographical region, a time of day, a number of past entries into lotteries, a number of past lottery wins, etc.

If the caller is determined to be a winner of the lottery, the caller is advised of the winning status in step 500. The caller can be advised while the communication services are being provided or after the communication services have been terminated. The caller can be advised of the winning status in any number of different ways, including providing the caller with a voice or visual message, a facsimile or e-mail transmission, etc.

Figure 4:
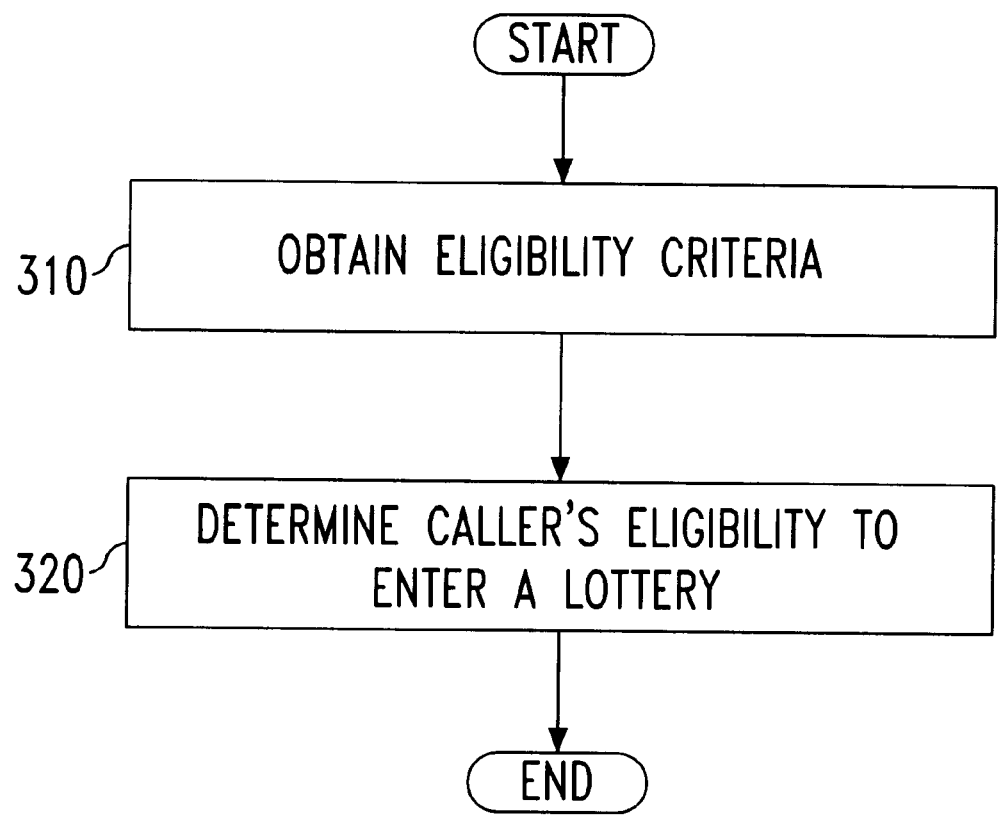
FIG. 4 is a flowchart of steps detailing how a caller's eligibility can be determined.

FIG. 4 is a flowchart of optional steps for performing step 300 in FIG. 3. In step 310, eligibility criteria are obtained. The eligibility criteria can include information regarding a caller's past participation history, such as a number of calls or total call time for the caller during a past time period, or other information related to the call such as a time of day, a call destination (e.g., a specific telephone number or geographic region), a dial-around code used to place the call, whether the call was made using a credit card, etc. In step 320, a determination is made of the caller's eligibility to enter a lottery. This determination can be made by comparing the eligibility criteria obtained in step 310 with stored eligibility data. For example, a dial-around number obtained in step 310 can be compared with a set of stored dial-around numbers; and if the obtained dial-around number matches one of the stored numbers, the caller can be determined eligible for entry into a lottery. Of course, the eligibility determination can be made based on two or more criteria in any way as desired. For example, even if a dial-around number used to make a call matches a stored dial-around number, a further determination can be made whether the number of calls placed by the caller during the last month is equal to or greater than a desired threshold number. Thus, even if the caller used an appropriate dial-around number that would otherwise entitle the caller entry into a lottery, if the caller has not placed a specified number of calls using the dial-around number in the past, entry into a lottery can be denied.

Figure 5:
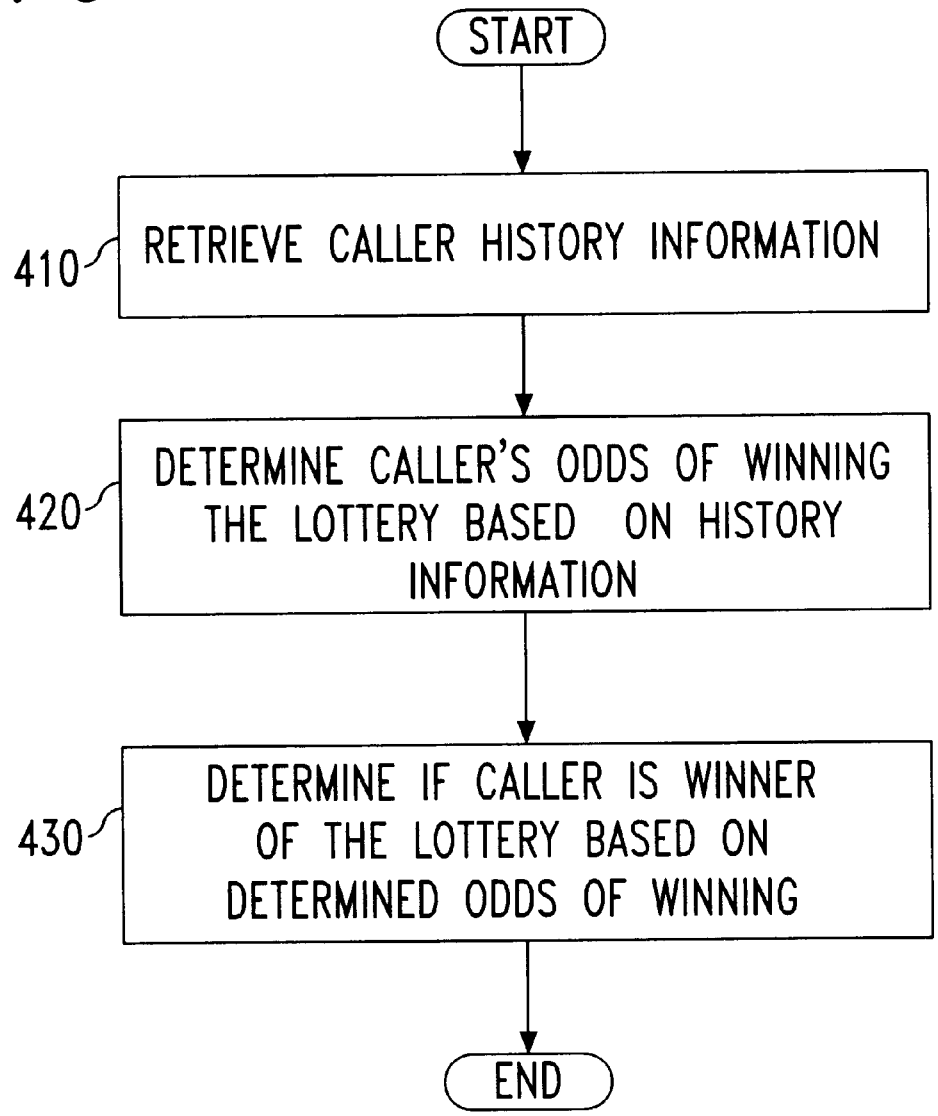
FIG. 5 is a flowchart of steps detailing how a caller's odds for winning a lottery can be determined.

FIG. 5 is a flowchart of optional steps for performing step 400 in FIG. 3. In step 410, caller history information is retrieved. This information can include information such as a number of calls recently made by the caller, a total call time logged by the caller, etc. In step 420, the caller's odds of winning the lottery are determined based on the retrieved information. For example, a caller's odds of winning the lottery can be increased if the caller has made more than a threshold number of calls during a past time period. Thus, callers that frequently use a service, such as a dial-around service, can be rewarded with increased odds of winning as compared to other callers that less frequently use the dial-around service. In step 430, a determination is made if the caller is a winner of the lottery based on the determined odds of winning. This determination can be made in any desired way, as discussed above. Thus, the caller's odds of winning can be adjusted by adjusting a number of entries allotted to the caller into a lottery, adjusting the odds of winning the lottery, etc.

While this invention has been described in conjunction with specific embodiments thereof, it is evident that many alternatives, modifications, and variations will be apparent to those skilled in the art. Accordingly, the embodiments of the invention as set forth herein are intended to be illustrative, not limiting. Various changes may be made without departing from the spirit and scope of the invention.

What is claimed is:

1. A method for entering a caller into a lottery, comprising:
    receiving an indication that communication services are to be provided to the caller so that the caller can at least receive information from a called party that is not associated with entering the caller into a lottery;
    determining if the caller is eligible for entry into a lottery;
    adjusting an odds of winning the lottery for the caller based on a participation history for the caller;
    determining if the caller is a winner of the lottery using the adjusted odds of winning; and
    advising the caller that the caller has won the lottery while providing communication services to the caller and the called party if the caller is determined to have won the lottery.

2. The method of claim 1, wherein the step of receiving an indication that communication services are to be provided comprises receiving a signal representing at least one of a telephone number and a dial-around number.

3. The method of claim 1, wherein the step of receiving an indication that communication services are to be provided comprises connecting the caller to the called party through a communications network.

4. The method of claim 1, wherein the step of determining whether the caller is eligible for entry into a lottery comprises determining whether the caller, a telephone number associated with the caller, or other identification information is consistent with stored information.

5. The method of claim 1, wherein the step of adjusting an odds of winning comprises comparing the participation history for the caller to stored odds criteria, wherein the participation history includes at least one of a number of past lotteries entered, a number of past lotteries won, a total number of calls made by the caller during a previous time period, a total amount of call time logged by the caller during a previous time period, a type of calls made, call destination information, a time of day or day, and a dial-around code for past calls.

6. The method of claim 1, wherein the step of adjusting an odds of winning comprises increasing an odds of winning for the caller if the caller has made more than a threshold number of calls using a specified dial-around code during a previous time period.

7. A method for entering a caller into a lottery, comprising:
    receiving an indication that communication services are to be provided to the caller so that the caller can at least receive information from a called party that is not associated with entering the caller into a lottery;
    determining if the caller is eligible for entry into a lottery;
    adjusting an odds of winning the lottery for the caller based on a participation history for the caller, the participation history including at least one of a number of past lotteries entered, a number of past lotteries won, call destination information, and a time of day or day;
    determining if the caller is a winner of the lottery using the adjusted odds of winning; and
    advising the caller that the caller has won the lottery if the caller is determined to have won the lottery.

8. A lottery device associated with a communication system that sends communication information between a caller and a called party, the lottery device comprising:
    a memory that stores information regarding at least a participation history for a caller;
    a lottery generator that adjusts the caller's odds of winning a lottery based on the caller's participation history and determines if the caller has won the lottery based on the adjusted odds of winning; and
    a controller that determines if the caller is eligible to enter the lottery, and notifies the caller while providing communication services to the caller and the called party if the caller has won the lottery.

9. The lottery device of claim 8, wherein the lottery generator increases an odds of winning for the caller if the caller has made more than a threshold number of calls using a specified dial-around code during a previous time period.

10. The lottery device of claim 8, wherein the communication system is a telecommunications network.

11. The lottery device of claim 8, wherein the communication system sends communication information at least in part over a computer network.

12. The lottery device of claim 8, wherein the controller determines whether the caller is eligible for entry into a lottery by determining whether the caller, a telephone number associated with the caller, or other identification information is consistent with stored information.

13. The lottery device of claim 8, wherein the lottery generator adjusts an odds of winning by comparing the participation history for the caller to stored odds criteria, where the participation history includes at least one of a number of past lotteries entered, a number of past lotteries won, a total number of calls made by the caller during a previous time period, a total amount of call time logged by the caller during a previous time period, a type of calls made, call destination information, a time of day or day, and a dial-around code for past calls.

\* \* \* \* \*